United States Patent

Hashimoto et al.

[11] Patent Number: 5,935,473
[45] Date of Patent: Aug. 10, 1999

[54] ELECTRODE STRUCTURE AND ELECTRIC HEATER

[75] Inventors: Shigeharu Hashimoto, Okazaki; Makoto Miyazaki, Nagoya; Tadato Ito, Nagoya; Hironori Ohkawa, Nagoya, all of Japan

[73] Assignee: NGK Insulators, Ltd., Japan

[21] Appl. No.: 08/632,367

[22] Filed: Apr. 10, 1996

[30]       Foreign Application Priority Data

Apr. 17, 1995   [JP]   Japan .................................... 7-090734
Sep. 14, 1995   [JP]   Japan .................................... 7-236485

[51] Int. Cl.⁶ ................................ H05B 3/08; B60L 1/02
[52] U.S. Cl. ........................................... 219/541; 219/205
[58] Field of Search .................................... 219/541, 205, 219/206, 207; 338/243, 244, 245; 174/65 R, 176, 177

[56]              References Cited

U.S. PATENT DOCUMENTS

| 2,542,583 | 2/1951 | Shea, Jr. .............................. | 174/65 SS |
| 2,924,467 | 2/1960 | Burch ..................................... | 174/151 |
| 3,912,907 | 10/1975 | Lodi . | |
| 4,193,012 | 3/1980 | Podiak et al. ........................... | 313/137 |
| 4,980,601 | 12/1990 | Aoki et al. .............................. | 313/143 |
| 5,238,650 | 8/1993 | Sheller et al. ........................... | 422/174 |
| 5,545,878 | 8/1996 | Jasper, II et al. ....................... | 219/541 |
| 5,626,785 | 5/1997 | Rajnik et al. ........................... | 219/541 |

FOREIGN PATENT DOCUMENTS

| 1207028 | 12/1965 | Germany . |
| 4302068 | 7/1994 | Germany . |
| 5-326118 | 12/1993 | Japan . |

*Primary Examiner*—Teresa Walberg
*Assistant Examiner*—Sam Paik
*Attorney, Agent, or Firm*—Parkhurst & Wendel, L.L.P.

[57]              ABSTRACT

An electrode structure includes a metallic electrode having a configuration of a bending cylinder and having a plurality of members disposed successively in an axial direction of the electrode and mutually connected with adjacent member (s); a case for installing the metallic electrode and one end of a lead wire for electrification therein; and an insulating member which is positioned between the case and the electrode and which the case from the electrode. An electric heater includes a housing, a honeycomb structure installed in the housing, and the electrode structure for electrifying the honeycomb structure. The electrode structure exhibits excellent composability, waterproof ability, and gas sealability.

33 Claims, 12 Drawing Sheets

ELECTRODE STRUCTURE AND ELECTRIC HEATER

BACKGROUND OF THE INVENTION AND RELATED ART STATEMENT

The present invention relates to an electrode structure and to an electric heater provided with the electrode. More specifically, the present invention relates to an electrode structure for electrifying, for example, a subject installed in a metallic housing and to an electric heater provided with the electrode structure.

In the catalytic converter used for purifying an exhaust gas of automobiles, etc., there has been known a technique to mount an electric heater on a catalytic converter so as to raise a temperature of a catalyst up to a working temperature in the early stage. The electric heater generally has a structure that a metallic honeycomb structure is installed and held in a metallic housing such as a can and that the honeycomb structure to be electrified is provided with an electrode for electrification.

As an electrode structure for such an electric heater, there has conventionally been proposed an electrode structure shown in FIG. 10. In FIG. 10, the electrode structure has an electrode 6 made of a metallic bolt. To the metallic bolt 6 are fixed insulating members (insulators) 8 and 8' and a jig 26 for fixing the insulators via a washer 10 by means of a nut 14. The insulating members insulate a metallic housing (can) 2 from the electrode 6. The electrode structure is inserted to a throughhole 12 arranged in the metallic housing 2 and fixed to the metallic housing by welding. One end of the electrode 6 inside the metallic housing 2 is connected with a part of a honeycomb structure 4 by means of a connecting member 16. Additionally, a gas sealability is maintained by a cement sealing material 28.

In an electric heater provided with such an electrode structure, the electrode structure preferably contains a lead wire in view of easy mounting on an exhaust gas pipe of automobiles, etc., one end of the lead wire being unitarily mounted on the electrode structure for convenience of composing. In this case, there sometimes happens that water splashes the electrode during driving a car, for example, in a rain, thereby causing an electric short, corrosion, etc., which require to be avoided.

An electric heater preferably has a small size in view of a space where the heater is fixed so as to actually use for an exhaust gas pipe of automobiles, etc. Particularly, a length of an electrode is preferably as short as possible. When a length of an electrode is shortened, it is required to consider inconvenience such as deterioration of a coat covering a lead wire because a temperature of an end portion of the electrode rises up, workability upon composing the electrode, and the like, when the length of the electrode is simply shortened.

Further, this electrode structure is required to ensure that a gas sealability is maintained and that the metallic housing is insulated from the electrode.

SUMMARY OF THE INVENTION

The present invention aims to solve the aforementioned problems. The present invention provides an electrode structure comprising: a metallic electrode having a configuration of a bending cylinder and having a structure that a plurality of members disposed successively in an axial direction of the electrode are mutually connected with adjacent member (s); a case for installing the metallic electrode and one end of a lead wire for electrification therein; and an insulating member which is positioned between the case and the electrode and which is insulating the case from the electrode.

In the aforementioned electrode structure, the electrode preferably comprises a first electrode member and a second electrode member, each having a cylindrical configuration and the second electrode member connecting with the lead wire at one end and the first electrode member at the other end so as to form a predetermined angle.

The present invention further provides an electrode structure comprising: a metallic electrode having a columnar configuration and having the lead wire at the top end of the electrode so as to form a predetermined angle with the electrode; a case for installing the metallic electrode and one end of a lead wire for electrification therein; and an insulating member which is positioned between the case and the electrode and which is insulating the case from the electrode.

In the aforementioned electrode structure, the case for insulating the electrode preferably comprises a lower member for installing a lower portion of the electrode, having a cylindrical portion covering a part or all of a peripheral surface of the electrode, and an upper member for installing an upper portion of the electrode, closing an opening portion of the cylindrical portion near an upper portion of the electrode.

The electrode structure preferably has a waterproof member positioned between the case for installing an electrode and the lead wire so as to avoid permeation of water from a gap between the case for installing an electrode and the lead wire.

Preferably, the electrode structure connects with a subject to be electrified, the subject being installed in a metallic housing, and is used to electrify the subject. The subject to be electrified preferably has a metallic honeycomb structure.

The present invention furthermore provides an electric heater comprising: a housing; a honeycomb structure installed in the housing; and one of the aforementioned electrode structures for electrifying the honeycomb structure.

DETAILED DESCRIPTION OF THE INVENTION

Figure 1:
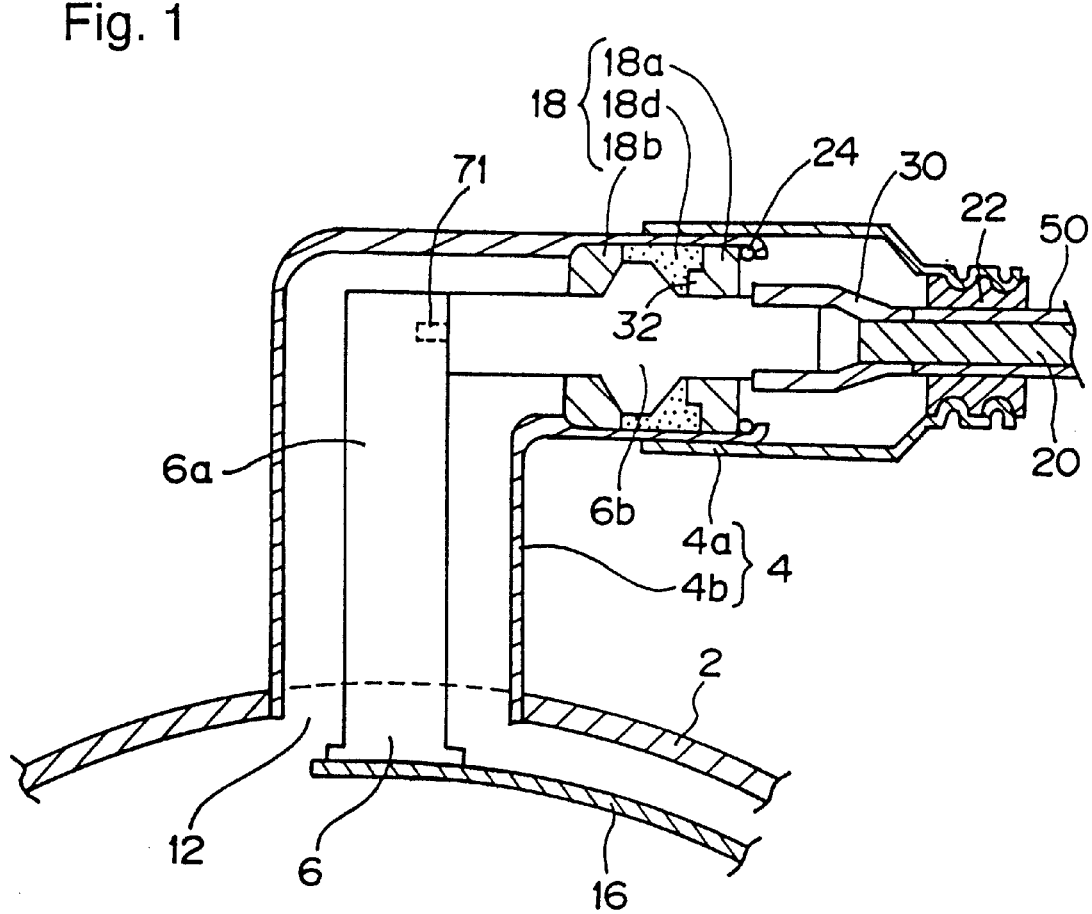
FIG. 1 is a cross-sectional view showing an embodiment of an electrode structure of the present invention.

When only a length of an electrode is just shortened, heat of an exhaust gas or the like is easily transmitted to an end of the electrode through case for holding an electrode and through the electrode. As a result, a temperature of the end of the electrode is prone to exceed a thermal resistant temperature of the aforementioned waterproof member and coating material covering a lead wire. Accordingly, the electrode structure is required to have a predetermined or larger distance from a connecting portion of the electrode and the substance to be electrified to the waterproof member.

In the present invention, an electrode has a bending configuration. Alternatively, a lead wire is connected to the upper end of an electrode so as to have a predetermined angle between the lead wire and the electrode, thereby imparting a bending configuration to the electrode structure. Thus, the electrode can have a practical size and a predetermined or larger distance from the connecting portion of the electrode and the subject to be electrified to the waterproof member can be maintained, thereby preventing the waterproof member or the like from deteriorating by an increase of a temperature at the top end of the electrode.

When an electrode having a bending configuration is prepared by only bending a unitarily formed electrode itself, attachment of a case for installing an electrode to the electrode becomes difficult. Accordingly, in the present invention, the electrode is composed of a plurality of members disposed successively in the axial direction of the electrode, each of the members being mutually connected to adjacent member(s), thereby overcoming difficulty in production.

A member constituting the electrode is preferably a metallic stick or a metallic cylinder. Each of the metallic stick and the metallic cylinder may have a bending configuration. The members are connected by welding, threaded engagement, etc.

The number of members constituting the electrode is preferably two. One end of one (the second electrode member) of the two members is connected with a lead wire, and one end of the other member (the first electrode member) is connected with a subject to be electrified. The other end of the first cylindrical member is connected with the other end of the second electrode member. The two members are connected so as to form an angle preferably smaller than 180°, more preferably within the range from 45° to 135°, furthermore preferably within the range from 80° to 100°. When the first electrode member is connected with the second electrode member by threaded engagement, preferably the first electrode member has a negative screw portion and the second electrode member has a positive screw portion.

When a bending configuration of the electrode structure is formed by connecting a lead wire to the top end of the electrode so as to have a predetermined angle, the angle between the lead wire and the electrode is preferably 50–150°, more preferably 60–120°, furthermore preferably 75–105°. The lead wire can be connected to the top end of the electrode by various kinds of means such as a direct welding, a connecting member, etc.

A case for installing an electrode is composed of the lower member for installing the lower portion of the electrode and the upper member installing the upper portion of the electrode. The lower member has a cylindrical portion covering a part or all of a peripheral surface of the electrode, and the upper member close an opening portion of the cylindrical portion near an upper portion of the electrode. This structure overcomes difficulty in production. That is, the top end of the electrode is exposed when the electrode is equipped with the lower member of the case for installing an electrode because the lower member does not cover the top end of the electrode, and therefore a lead wire is easily connected to the top end of the electrode. Incidentally, the upper member of the case for installing an electrode is attached to the lower member after the lead wire is connected to the electrode.

An electrode structure of the present invention preferably has a waterproof member positioned between a case for installing an electrode and a lead wire so as to avoid water permeation from the gap between the case for installing an electrode and the lead wire.

The aforementioned waterproof member is preferably an insulating organic composite having a thermal resistance or a glass. Specifically, the insulating organic composite is preferably poly(tetrafluoroethylene) (commercial name: Teflon) or an organic composite containing fluorine such as fluoro-rubber. However, Teflon is more preferable because Teflon has a less weight decrease at a high temperature. Further, a glass may be mixed with Teflon so as to enhance thermal resistance. A waterproof member preferably has a thermal resistance of 100°0 C. or more, more preferably 150° C. or more.

The waterproof member is preferably fixed by crimping the case for installing an electrode from outside the case for installing an electrode in the portion where the waterproof member is disposed in view of ensuring to avoid water permeation into the electrode. Alternatively, sealing with an adhesive a gap between the case for installing an electrode and the waterproof member and/or a gap between the waterproof member and the lead wire can ensure to avoid water permeation into the electrode. The electrode structure preferably has a waterproof ability of 1 cc/min or less of water permeation under 0.5 atm. The adhesive preferably has a large expansion coefficient so as to endure the repeated temperature change between high temperature and low temperature as in an automobile exhaust gas system. Additionally, the adhesive preferably has a water-repellent ability because the adhesive contacts with water. From these view points, an organic adhesive, specifically polyimide or the like, is preferably used.

A lead wire is usually covered with a coating material. The coating material preferably has a thermal resistance of 100° C. or more. Specifically, a core wire with Teflon coating, a core wire with polyimide tape winding there-around and with a woven glass fiber covering the polyimide tape, or the like is used as a lead wire covered with a coating material. The core wire preferably has a diameter of 1.0–5.0 mm. Further, the core wire is preferably composed of thin wires each having a diameter of 0.5 mm or less, the wires being twisted into a core wire.

An electrode structure of the present invention has an insulating member between the electrode and the case for installing an electrode. The insulating member ensure the insulation of the case for installing an electrode from the electrode.

The insulating member is preferably composed of the first insulator, the second insulator, and an inorganic powder packed in a gap between the first insulator and the second insulator because of an excellent gas sealability. Further, such an insulating member hardly deteriorate in gas sealability and insulating ability even if a solid comes flying from outside the exhaust gas pipe and collides with the electrode. An inorganic powder is packed in the gap preferably under a pressure. Specifically, an inorganic powder is preferably talc, kaolin, or the like. Each of the first insulator and the second insulator preferably has a structure which can hold an inorganic powder between the electrode and the case for installing the electrode. Alternatively, a ceramic material having a predetermined strength, specifically an alumina material, a porcelain material, or the like can be used for each of the first and the second insulators. Incidentally, the inorganic material is preferably packed in a gap between the first insulator and the second insulator with a load of, for example, 200 kgf or more. The second insulator directly contacting the inorganic powder preferably has a difference in level because a packed inorganic powder is not loosen even if heat cycles and vibrations are transmitted to the inorganic powder.

Incidentally, when an electrode having a bending configuration is used and the electrode is composed of two members, an insulating member composed of the first insulator, the second insulator, and an inorganic powder packed in a gap between the first and the second insulators are preferably disposed between the second electrode member and the case for installing an electrode in view of workability upon composing the electrode structure, preventing temperature increase in the waterproof member, etc.

Additionally, a gap between the insulating member and the electrode and a gap between the electrode and the case for installing an electrode may be sealed with a metallic sealing material. Preferably, a spring member and a pressing member are positioned between the electrode and the case for installing an electrode. The spring member absorbs differences in thermal expansion among the electrode, the case for installing an electrode, and the insulating member. The pressing member transmits a load to the spring member. Such a structure can maintain gas sealability by a metallic sealing material and absorb differences in thermal expansion among members by the spring member. The pressing member may be fixed to the electrode by forming the pressing member so as to have a configuration of a nut and being engaged with the electrode. Alternatively, the pressing member may be fixed to the electrode by crimping a part of the pressing member against the electrode or by being welded directly to the electrode.

When an electrode having a bending configuration is used and the insulating member is positioned between the second electrode member and the case for installing an electrode, the spring member and the pressing member are positioned between the second electrode member and the case for installing an electrode.

The case for installing an electrode may be insulated from the electrode by coating an insulating coating material on one or both of the electrode and the case for installing an electrode. The electrode with an insulating coat is preferably inserted into the case for installing an electrode under a pressure in view of an airtightness. Alumina, ceramics, or the like, is suitably used as an insulating coating material. However, plasma-sprayed alumina is preferable as an insulating coat.

Incidentally, when an electrode having a bending configuration is used and the electrode is composed of two members, either of the first electrode member and the second electrode member may be provided with an insulating coating material.

When the electrode is covered with an insulating coating material, a gap between the case for installing an electrode and the insulating coating material is preferably sealed with a metallic sealing material. When the case for installing an electrode is covered with an insulating coating material, a gap between the electrode and the insulating coating material is preferably sealed with a metallic sealing material. The reason is that gas sealability is imparted to the electrode.

A gap between the electrode and the case for installing an electrode is preferably sealed with an inorganic powder because gas sealability and impact resistance are imparted to the electrode. The inorganic powder is preferably packed in the gap under a pressure as described above.

Gaps formed mutually by the insulator, the case for installing an electrode, and the electrode may be sealed with a cement sealing material, thereby imparting gas sealability to the electrode.

In an electrode structure of the present invention, an electrode is fixed to a metallic housing via an insulating member and a case for installing an electrode. One end of the electrode located inside the metallic housing is connected with a part of a subject to be electrified directly or via a metallic connecting member by means of welding, or the like.

A subject to be electrified is, for example, a metallic honeycomb structure. A metallic honeycomb structure connected with an electrode of the present invention forms an electric heater which is mounted on a catalytic converter for purifying automobile exhaust gas, or the like. Not only a metallic honeycomb structure but also various subjects to be electrified can be used for an electrode structure of the present invention.

The present invention is hereinbelow described in more details with reference to the illustrated embodiments. However, the present invention is by no means limited to these embodiments.

FIG. 1 is an explanatory view showing an embodiment of an electrode structure in which the electrode has a bending configuration of the present invention. In FIG. 1, reference numerals 2, 4, 6, 16, 18*a*, 18*b*, 18*d*, 20, 22, and 24 denote a metallic housing, a case for installing an electrode, an electrode made of metallic stick, a metallic connecting member, the first insulator, the second insulator, an inorganic powder, a lead wire, a waterproof member, and a caulking ring, respectively.

In the electrode structure shown in FIG. 1, the electrode 6 is composed of the first electrode member 6a and the second electrode member 6b, each having a cylindrical configuration. The second electrode member 6b is threadedly engaged with the first electrode member 6a so as to form an angle of about 90° to each other. The first electrode member 6a has a negative screw portion, and the second electrode member 6b has a positive screw portion. The first electrode member 6a is inserted into a throughhole 12 arranged in a metallic housing 2. The second electrode member 6b is fixed to the case 4 for installing the electrode via the insulating member 18 composed of the first insulator 18a, the second insulator 18b, and an inorganic powder 18d packed in a gap between the first and the second insulating members 18a, and 18b. The case 4 for installing an electrode is successively connected with the metallic housing 2. In the embodiment shown in FIG. 1, the first case member 4a is the outer side and the second case member 4b in the inner side are partially laminated to form a dual structure in the case 4 for installing an electrode. The second case member 4b is caulked in the top periphery of the second insulator 18b via the caulking ring 24. The use of the caulking ring 24 enables to pack the inorganic powder 18d under a pressure without excessively stressing the second insulator 18b. Preferably, the caulking ring 24 has a larger thermal expansion coefficient than the second case member 4b because the caulking ring 24 absorbs a difference of thermal expansion between the second case member 4b and the insulating member 18 upon being heated, thereby avoiding deterioration of sealability. Preferably, the first case member 4a and the second case member 4b are airtightly connected with each other in the all periphery of the laminated portion by welding or the like, preferably by laser welding, so as to prevent the electrode structure from permeation of water from a gap between the first case member 4a and the second case member 4b.

The waterproof member 22 is placed between the case 4 for installing an electrode and the lead wire 20. The case 4 for installing an electrode is crimped in the portion where the waterproof member 22 is connected, thereby avoiding forming a gap between the case 4 for installing an electrode and the waterproof member 22 and a gap between the waterproof member 22 and the lead wire 20 so as to have a structure of ensuring that water permeation from a gap between the case 4 for installing an electrode and the lead wire 20 does not happen. The lead wire 20 is electrically connected with the electrode 6 by a connecting member 30 at the bottom end of the lead wire 20 and the upper end of the electrode 6. The other end of the electrode 6, which is inside the metallic housing 2, is connected with a subject to be electrified in a part there of, which is not illustrated, by means of a metallic connecting member 16.

The electrode structure is excellent in composability, productivity, and gas seatability. Further, even if a solid comes flying from outside the exhaust gas pipe and collides with the electrode, gas sealability and insulating ability hardly deteriorate, and the electrode structure is structurally strong and has high safety.

Incidentally, since the first insulating member 18a, has a difference in level 32 in the electrode structure shown in the FIG. 1, the inorganic powder 18d packed in a gap between the first insulator 18a, and the second insulator 18b is hardly loosened even if heat cycles and vibrations are transmitted to the electrode.

Figure 5:
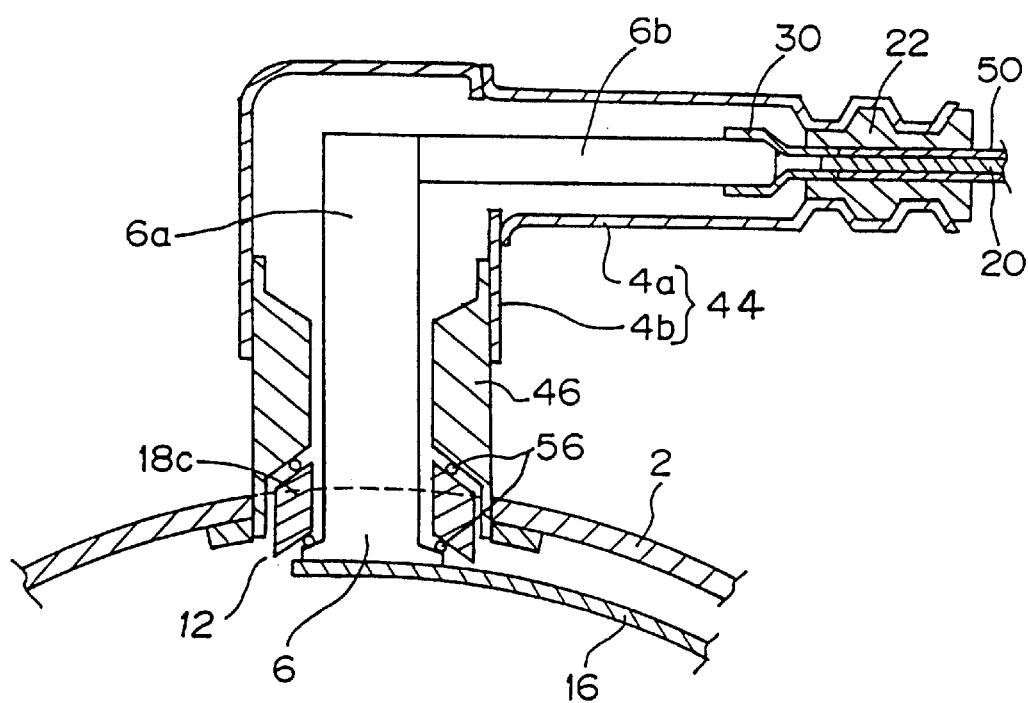
FIG. 5 is a cross-sectional view showing another embodiment of an electrode structure of the present invention.

FIG. 5 shows an embodiment of sealing a gap between the insulating member, which is positioned between the case for installing an electrode and electrode, and an electrode and a gap between the insulating member and the case for installing an electrode with a metallic sealing material. In the electrode structure, the electrode has a bending configuration.

In the electrode structure shown in FIG. 5, the insulator 18c is positioned between the second case member 46 and the first electrode member 6a. A gap between the insulator 18c and the first electrode member 6a and a gap between the insulator 18c and the second case member 46 for installing the electrode are sealed with a metallic sealing member 56. In this embodiment, the first electrode member 6a is connected with the second electrode member 6b by welding. This embodiment has the same waterproof structure as in the embodiment shown in FIG. 1.

Figure 6:
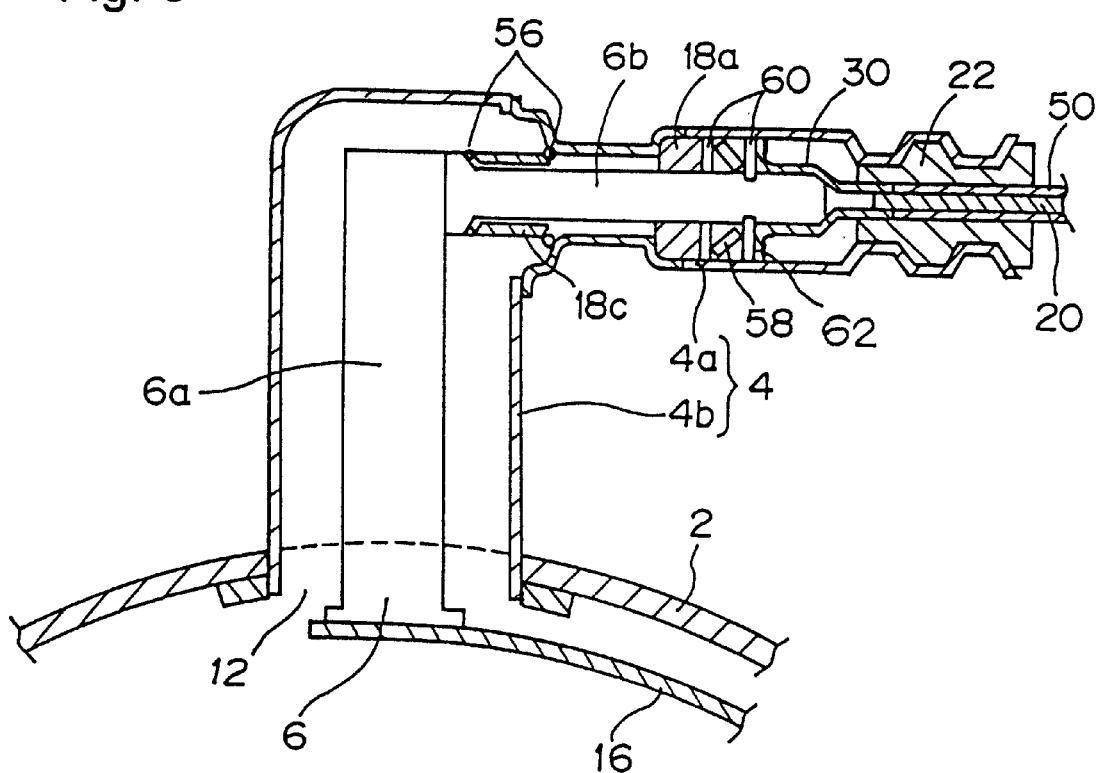
FIG. 6 is a cross-sectional view showing still another embodiment of an electrode structure of the present invention.

FIG. 6 shows another embodiment of sealing a gap between the insulating member, which is positioned between the case and the electrode, and the electrode and a gap between the insulating member and the case. In the electrode structure, the electrode has a bending configuration.

In the electrode structure shown in FIG. 6, the insulating members 18a, and 18c are positioned between the second electrode member 6b and the case 4 for installing an electrode. A gap between the second insulator 18c and the case member 4a and a gap between the second insulator 18c and the second electrode member 6b are sealed with a metallic sealing material 56.

A belleville spring 58 is supported from the top and bottom by pressing members 60. The upper pressing member 60 is supported by a flange 62 formed in the lower opening portion of the connecting member 30.

The waterproof structure is the same as in the embodiment shown in FIG. 1. The flange 62 effectively transmits a load applied to the electrode caused by a difference in thermal expansion to the belleville spring 58 in the same manner as the pressing members 60 do.

The electrode structure in FIG. 6 has differences from the electrode structure in FIG. 5. The differences are that the electrode structure in FIG. 6 is provided with the insulating member around the second electrode member 6b, that the electrode structure is provided with the spring structure for absorbing difference in thermal expansion, that the case 4 for installing an electrode is composed of two members, and that the case 4 for installing an electrode is provided with a supporting portion 64 for the insulator 18a.

Figure 7:
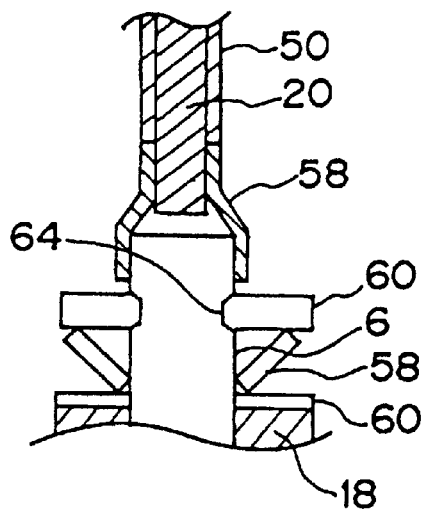
FIG. 7 is a cross-sectional view showing an embodiment of fixing a pressing member to an electrode of the present invention.

As shown in FIG. 7, the pressing member 60 may be fixed to the electrode 6 by arranging a holding portion 64 in the pressing member 60 in the predetermined portion and keying an inner bank portion of the pressing member 60, which has a configuration of a partially cut ring, to the holding portion 64 in the electrode 6.

Figure 8:
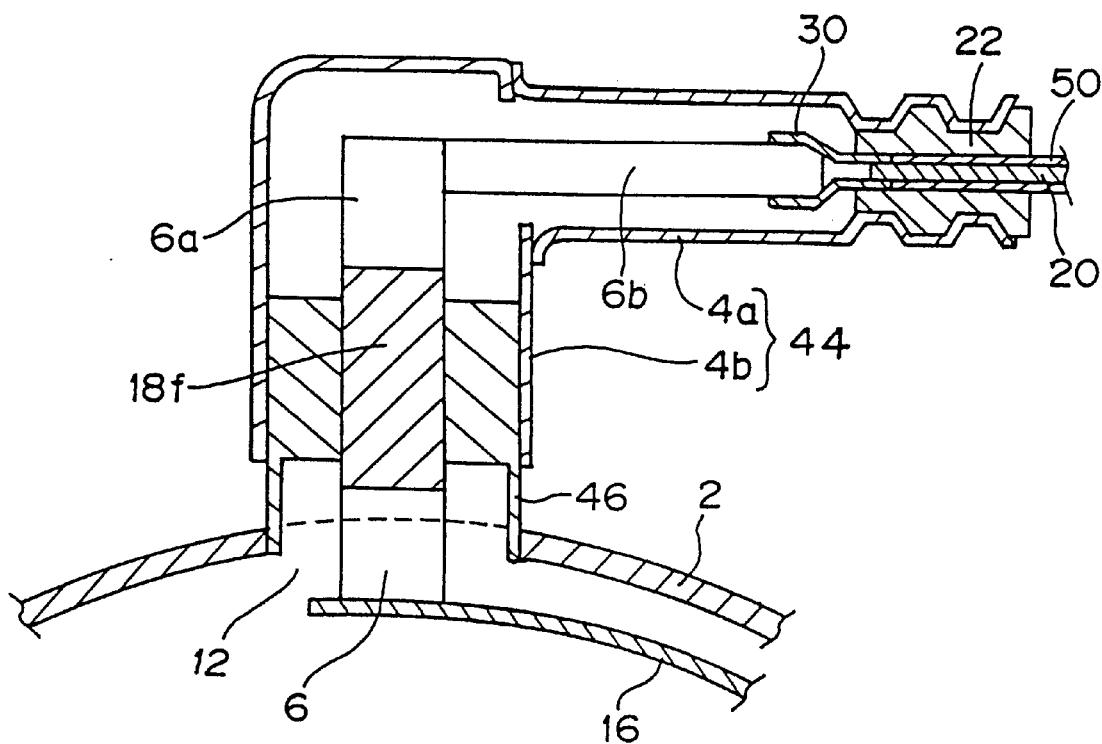
FIG. 8 is a cross-sectional view showing yet another embodiment of an electrode structure of the present invention.
Figure 9:
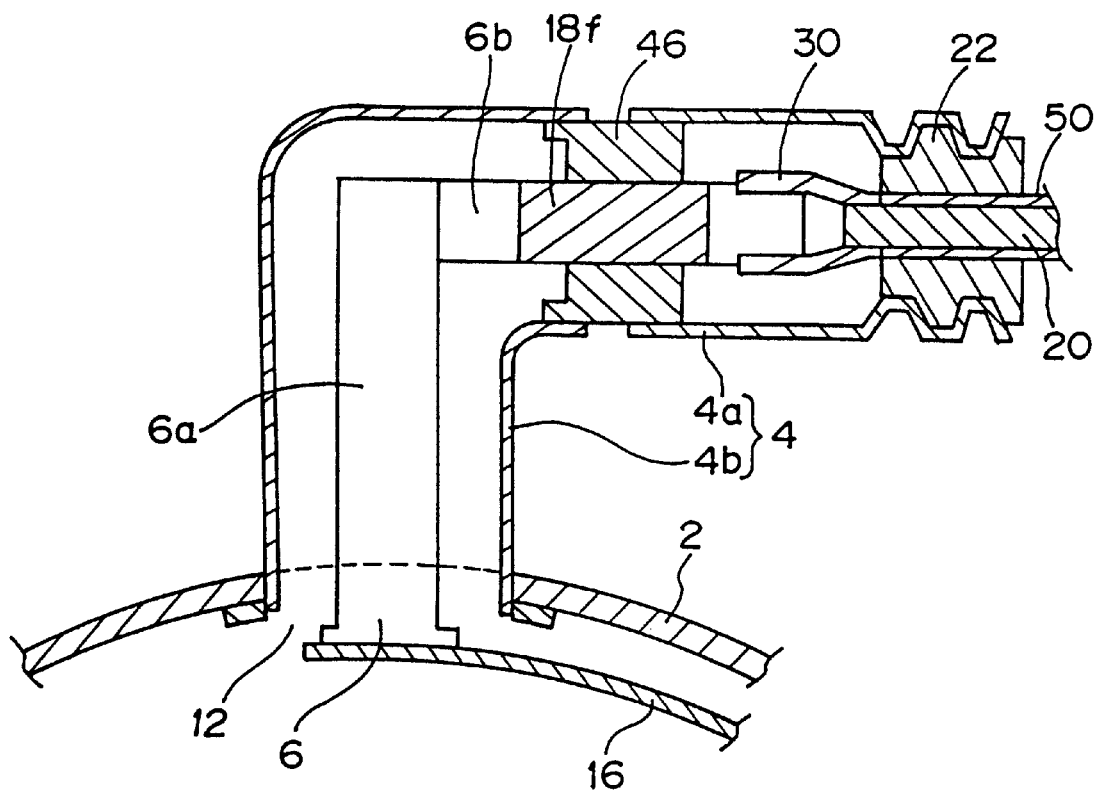
FIG. 9 is a cross-sectional view showing yet another embodiment of an electrode structure of the present invention.

FIGS. 8 and 9 show embodiments of insulating the case for installing an electrode from the electrode by plasma-spraying alumina on the electrode. Each of the embodiments employs an electrode having a bending configuration. In FIG. 8 the insulating coating material 18f is coated on the first electrode member 6a, while in FIG. 9 the insulating coating material 18f is coated on the second electrode member 6b. The electrode with the insulating coating material 18f being coated thereon is inserted under a pressure in the second case 46 for installing an electrode. The waterproof structure of these embodiments is the same as that of the embodiment in FIG. 1.

Figure 18:
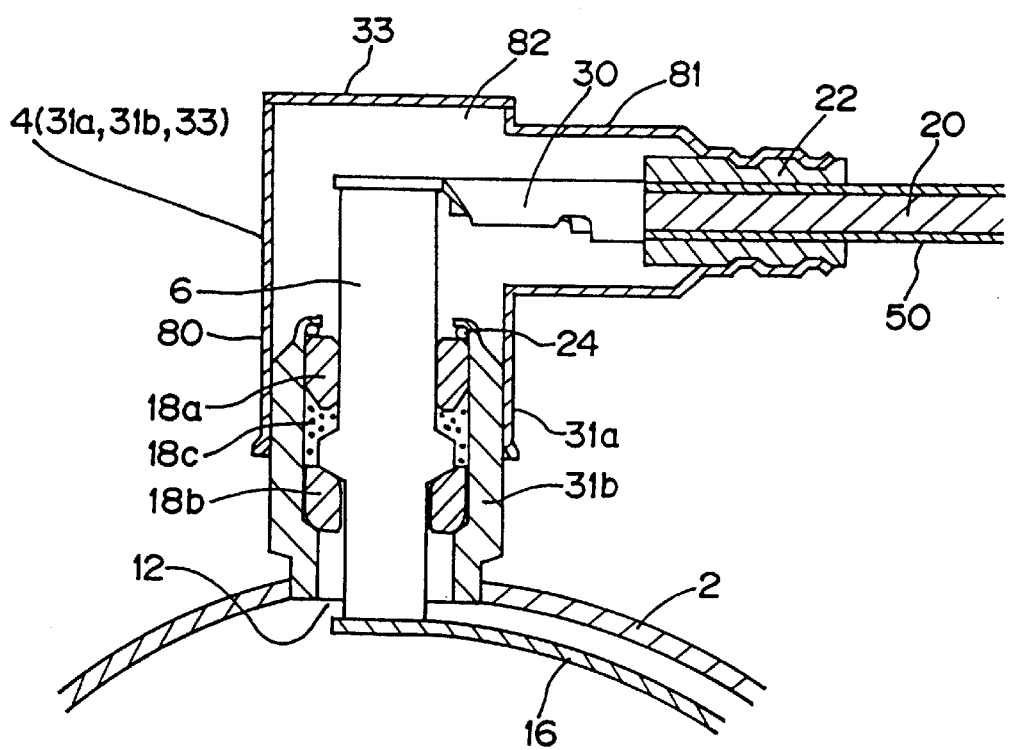
FIG. 18 is a cross-sectional view showing yet another embodiment of an electrode structure of the present invention.

FIG. 18 is an explanatory view showing an embodiment of connecting a lead wire to an electrode so as to form a predetermined angle of the present invention.

In the electrode structure shown in FIG. 18, a lead wire 20 is welded to the top end of the electrode 6 so as to have an angle of about 90° by means of a connecting member 70. The electrode 6 has a flat top portion, where a flat portion of the connecting member 70 is welded. The electrode 6 is fixed to the case 4 for installing an electrode via the insulating member 18 composed of the first insulator 18a, the second insulator 18b, and the talc 18c packed between the first and the second insulators 18a, and 18b. The case 4 for installing an electrode is successively connected with a metallic housing 2 and composed of the lower case member 31 and the upper case member 33. The lower case member 31 is composed of the first cylindrical portion 80 and the second cylindrical portion 81. The first cylindrical portion 80 covers the periphery of the electrode 6. The second cylindrical portion 81 covers the lead wire 20. The first cylindrical portion 80 is connected with the second cylindrical portion 81 so as to form an angle of about 90°. The upper case member 33 has a discoidal configuration and closes the upper opening portion 82 of the first cylindrical portion 80. The lower case member 31 has a dual structure formed by laminating the first member 31a in the outside and the second member 31b in the inside. The second member 31b is caulked by means of the caulking ring 24 from outside in the periphery of the upper end of the first insulator 18a. The role of the caulking ring 24 is the same as in the electrode structure shown in FIG. 1. The laminated portion formed of the first member 31a and the second member 31b is preferably welded to ensure airtightness in every part of the laminated portion so as to avoid permeation of water between the first and second members 31a and 31b. A waterproof structure between the case 4 for installing an electrode and the lead wire 20 is the same as that of the embodiment in FIG. 1.

This electrode structure is composed as follows:

The second member 31b of the lower case member 31 is fixed to the electrode 6 via the insulating member 18. The second member 31b is caulked by means of the caulking ring 24. A gap formed among the insulating members 18a, and 18b and the second member 31b may be sealed with a metallic sealing material.

Then, the first member 31a of the lower case member 31 is fixed to the second member 31b by press-inserting and welding (laser welding or Tig, i.e., Tungsten-insert-gas welding) all the connecting portion.

Subsequently, a lead wire 20 provided with a connecting member 70 is inserted into the second cylindrical portion 81 of the lower case member 31 from the opening portion. The lead wire 20 is welded (by Tig welding or projection welding) to the top end of the electrode 6.

Then, the upper case member 32 is welded so as to cover the upper opening portion 82 of the first cylindrical portion 80.

The waterproof member 22 is positioned between the second cylindrical portion 81 of the lower case member 31 and the lead wire 20. The second cylindrical portion 81 is crimped from outside to fix the waterproof member 22 to the lead wire 20 and the second cylindrical portion 81.

This electrode structure is excellent in composability, productivity, and gas sealability. Further, even if a solid comes flying from the outside the exhaust gas pipe and collides with the electrode, gas sealability and insulating ability hardly deteriorates, and the electrode structure is structurally strong and has high safety.

Figure 19A:
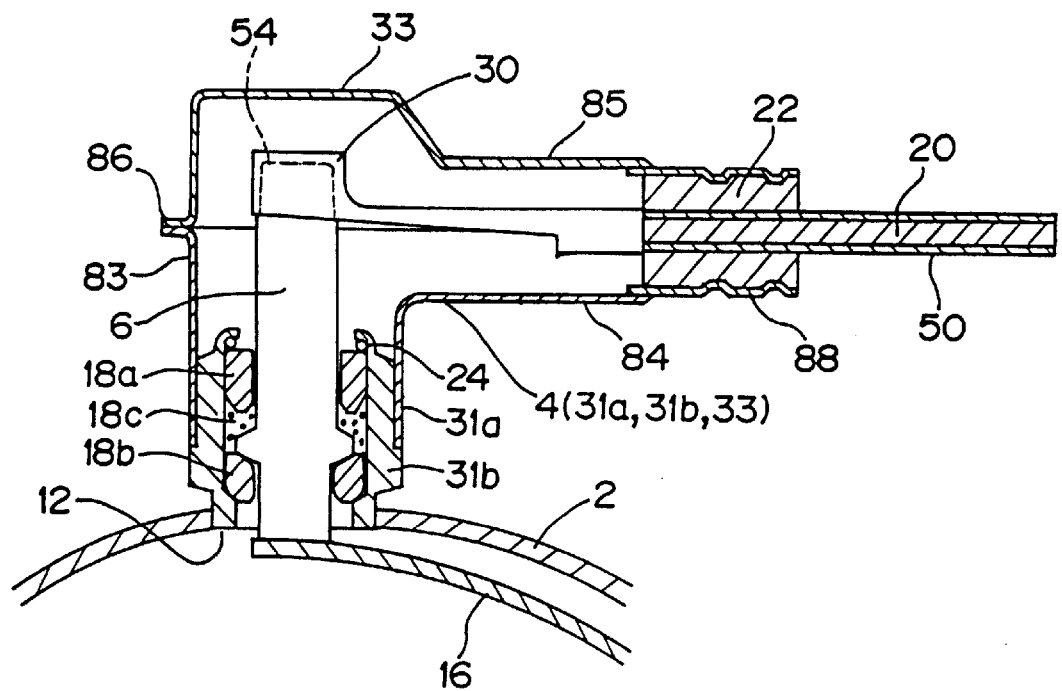
FIG. 19(a) is a cross-sectional view showing yet another embodiment of an electrode structure of the present invention.
Figure 19B:
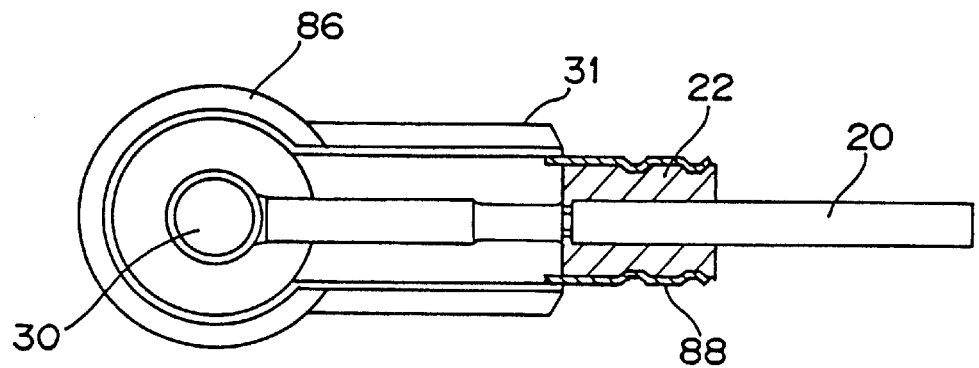
FIG. 19(b) is a plan view from the top of the electrode structure shown in (a) in which the upper case member for installing the upper portion of the electrode is removed.

FIG. 19 shows another embodiment of connecting a lead wire to an electrode in the top portion thereof of the present invention.

In the electrode structure shown in FIG. 19, a lead wire 20 is welded to the top portion of the electrode 6 as to form an angle of about 90° by means of connecting member 70. The connecting member 70 has a hole portion 54 having a configuration matching the top portion of the electrode 6 so that the electrode 6 is engaged with the hole portion 54 of the connecting member 70. The lower case member 31 is composed of a cylindrical portion 83 and a half cylindrical portion 84. The cylindrical portion 83 covers the lower periphery of electrode 6. The half cylindrical portion 84 covers the lower periphery of a lead wire 20 and is oriented so as to form an angle of about 90° with the cylindrical portion 83. The upper case member 33 closes the opening portion of the cylindrical portion 83 and has a half cylindrical portion 85. The upper case member 33 covers the upper periphery of the lead wire 20. Each of the lower case member 31 and the upper case member 33 has a flange 86 so as to connect with each other by welding at the flange 86. An insulating structure and a waterproof structure of the embodiment in FIG. 19 are the same as those of the embodiment in FIG. 18.

The electrode structure in FIG. 19 is composed as follows:

The insulating member 18 and the lower case member 31 are fixed to the electrode 6 in the same manner as in FIG. 18.

Then, the lead wire 20 provided with the connecting member 70 covering the electrode 6 is welded to the top portion of the electrode 6 by spot welding.

Subsequently, the upper case member 33 is connected with the lower case member 31 at their flanges 86 by Tig welding or seam welding all around the periphery.

Then, a portion 88 for covering the waterproof member is fixed to the cylindrical portion of the case for installing an electrode. The case for installing an electrode is formed of the lower case member 31 and the upper case member 33, each having a half cylindrical configuration, by Tig welding all around the periphery. A waterproof member is fixed to the electrode structure in the same manner as in FIG. 18.

Figure 20:
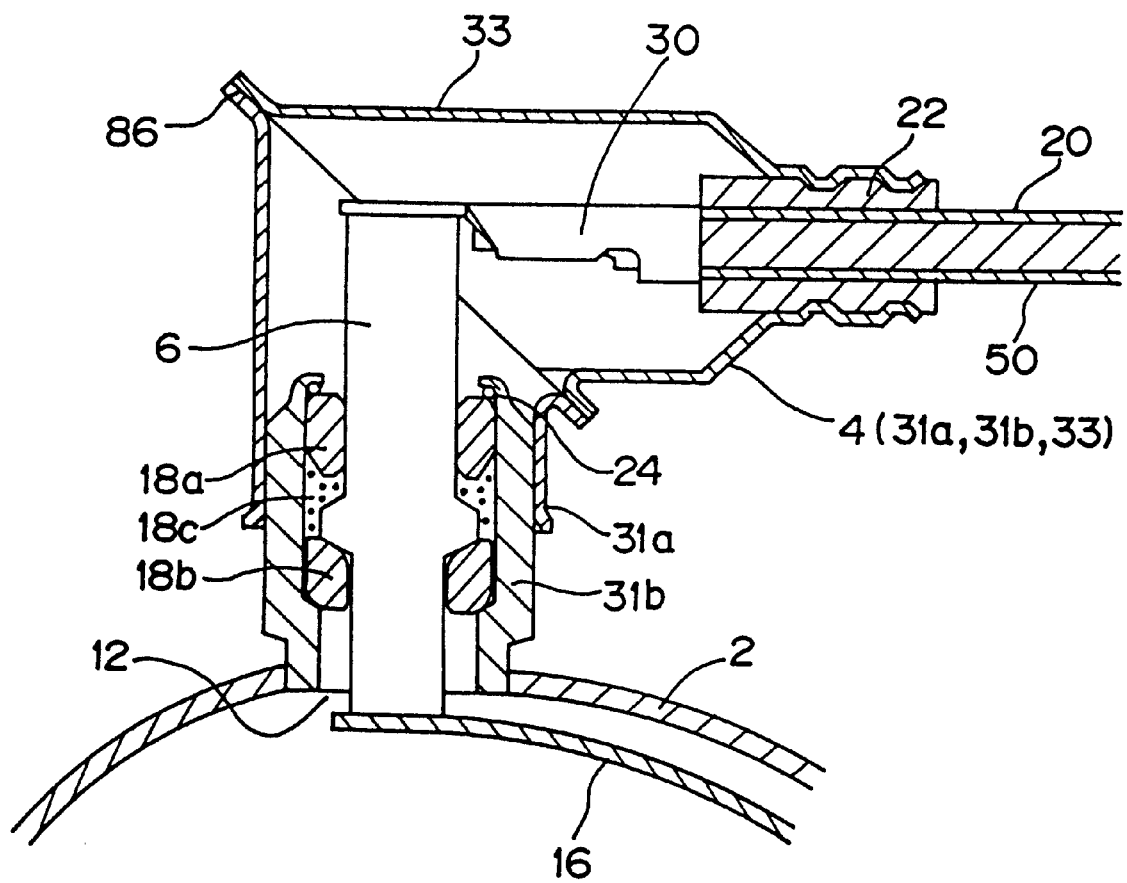
FIG. 20 is a cross-sectional view showing yet another embodiment of an electrode structure of the present invention.

FIG. 20 shows still another embodiment of connecting a lead wire to the top portion of an electrode so as to form a predetermined angle of the present invention.

In the electrode structure shown in FIG. 20, each of the lower case member 31 and the upper case member 33 has a surface end having an angle of about 45° to the axis. The surface end has a flange 86. The lower case member 31 and the upper case member 33 is connected at the flanges 86 so as to form an angle of 90° in the case 4 for installing an electrode.

The lead wire 20 is connected with the electrode 6 in the same manner as in the embodiment in FIG. 18. An insulating structure and an waterproof structure are also the same as in the embodiment in FIG. 18.

The electrode structure in FIG. 20 is composed according to the method applied to the electrode structures in FIG. 18 and FIG. 19. That is, first, the lower case member 31 is fixed to the electrode 6. Subsequently, the lead wire 20 is connected with the electrode 6. Finally, the upper case member 33 is fixed to the lower case member 31. Incidentally, the lower case member 31 is Tig welded to the upper case member 33.

Incidentally, a spring structure such as a belleville spring 55 can be arranged between the electrode 6 and the case 4 for installing an electrode as in an embodiment in FIG. 6 even when a lead wire is connected to the top portion of the electrode so as to form a predetermined angle, thereby absorbing a difference in thermal expansion between the electrode 6 and the case 4 for installing an electrode. In this case, the pressing members 60 are preferably arranged on and beneath the belleville spring 58.

Figure 2:
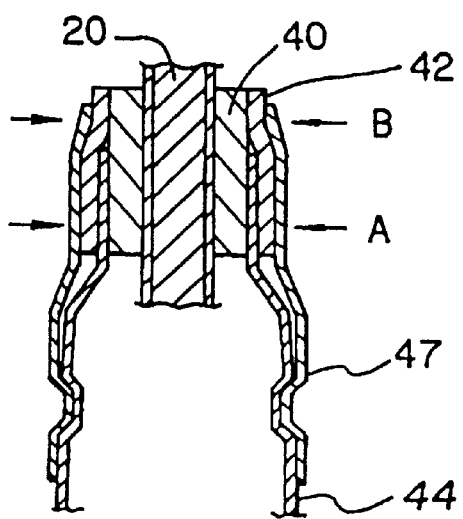
FIG. 2 is a cross-sectional view showing an embodiment of a waterproof structure of an electrode of the present invention.
Figure 3:
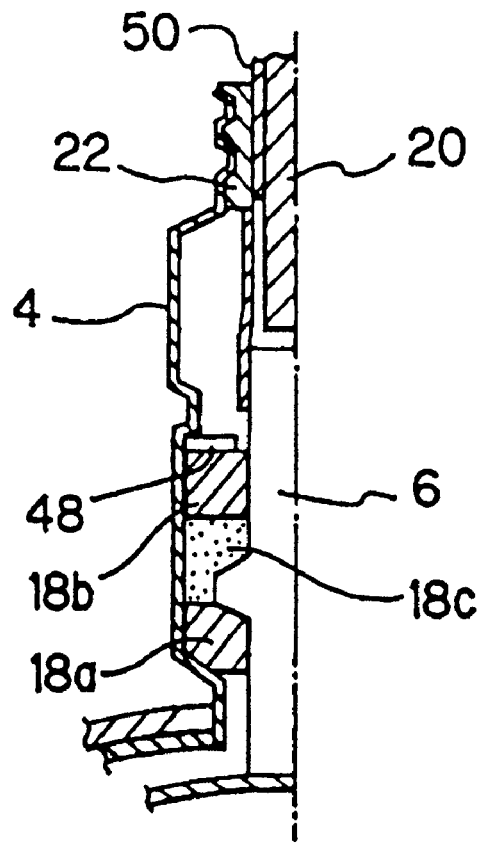
FIG. 3 is a cross-sectional view showing another embodiment of a waterproof structure of an electrode of the present invention.
Figure 4:
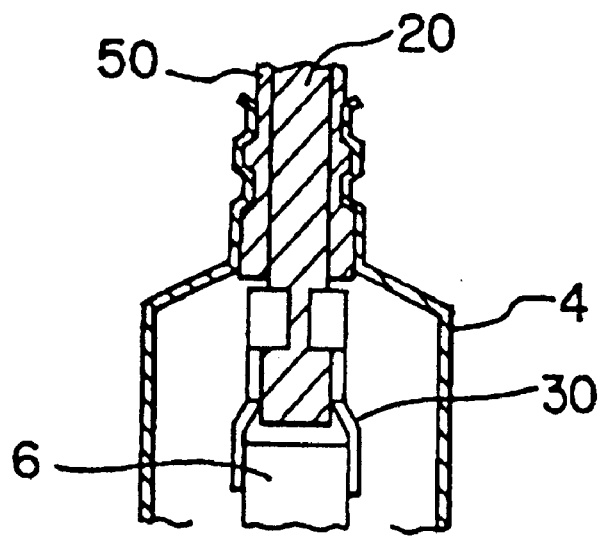
FIG. 4 is a cross-sectional view showing still another embodiment of a waterproof structure of an electrode of the present invention.

Incidentally, the waterproof structure in the electrode structure in FIG. 20 may be the same as in FIGS. 2, 3, or 4.

In the embodiment in FIG. 2, the first waterproof member 40 surrounds the lead wire 20. The first waterproof member 40 is held by the case 4 for installing an electrode in the lower portion thereof. A waterproof tube 42 such as Teflon tube is wound on the upper portion of the first waterproof member 40. The waterproof tube 42 is surrounded by the waterproof-member holder 47. The waterproof-member holder 47 is crimped from outer periphery at the points A and B.

In this structure, the waterproof tube 42 is positioned between the case 4 for installing an electrode and the waterproof-member holder 47 at the point A, thereby ensuring to avoiding water permeation because of the difference in thermal expansion. Since the waterproof-member holder 47 is crimped at the point B together with the first waterproof member 40 and the waterproof tube 42, water does not permeate at this point. Accordingly, this structure ensures every high waterproof ability.

In the embodiment shown in FIG. 3, one-piece type of case 4 for installing an electrode is employed instead of the two-piece type of case 4 shown in FIG. 1. An insulating member is positioned between the case 4 for installing an electrode and the electrode 6. The waterproof member 22 is positioned between the case 4 for installing an electrode and the lead wire 20. In this structure, the case 4 for installing an electrode is caulked from outside with employing a caulking member 48 in the side of the lead wire of the second insulator 18*b*.

FIG. 4 is an embodiment showing another waterproof structure between the case for installing an electrode and the lead wire. In this embodiment, the coating material 50 covering the lead wire 20 also works as a waterproof member. The coating material 50 is directly crimped from outside the case 4 for installing an electrode. In this case, the coating material 50 of the lead wire 20 should have or preferably has a waterproof ability as described above. This structure requires less number of parts, and therefore, the composability enhances.

The electrode can be connected with a lead wire in various kinds of methods. FIGS. 11–16 show the embodiments.

Figure 11:
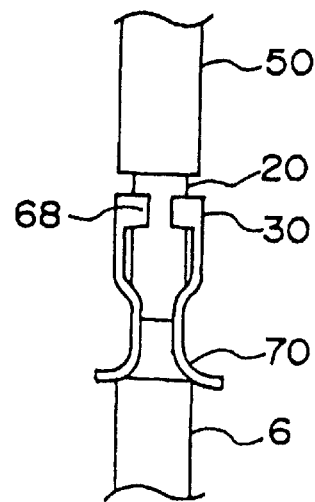
FIG. 11 is a partial explanatory view showing an embodiment of connecting a lead wire with an electrode.

In FIG. 11, the lead wire 20 is connected with the electrode 6 by means of the connecting member 30. The connecting member 30 is fixed to the lead wire 20 by means of protrusions 68 formed at one end of the connecting member 30. The other end of the connecting member 30 is curving toward outside to form a holding portion 70 where the connecting member 30 is projection welded to the electrode 6.

Figure 12:
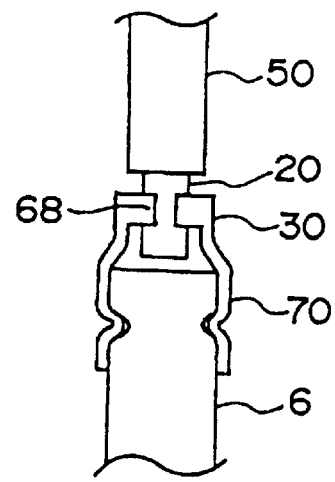
FIG. 12 is a partial explanatory view showing another embodiment of connecting a lead wire with an electrode.

In FIG. 12, the connecting member 30 is fixed to the lead wire 20 by means of protrusions 68 formed at one end of the connecting member 30 and to the electrode 6 by caulking the connecting member in the holding portion 70 formed at the other side. The connecting member 30 may be spot welded to the electrode 6.

Figure 13:
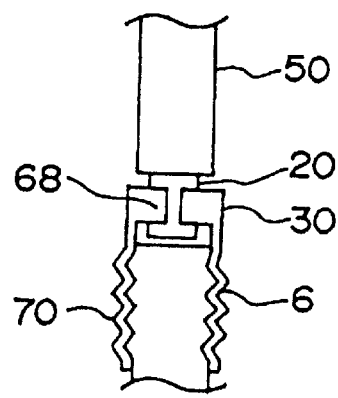
FIG. 13 is a partial explanatory view showing still another embodiment of connecting a lead wire with an electrode.

In FIG. 13, the connecting member 30 is fixed to the lead wire 20 by means of protrusions 68 formed at one end of the connecting member 30 and to the electrode 6 by threadedly engaging each other by means of a negative screw portion formed at the other end of the connecting member 30 and the positive screw portion formed on the electrode.

Figure 14:
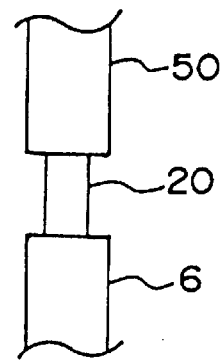
FIG. 14 is a partial explanatory view showing yet another embodiment of connecting a lead wire with an electrode.
Figure 15:
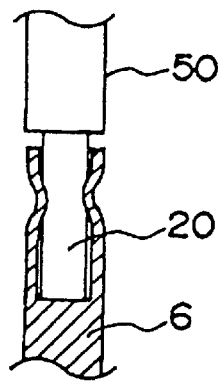
FIG. 15 is a partial explanatory view showing yet another embodiment of connecting a lead wire with an electrode.

In FIG. 14, the lead wire 20 is directly connected with the electrode 6. In FIG. 15, one end of the electrode 6 is formed so as to have a cylindrical configuration. One end of the lead wire 20 is inserted in the cylindrical portion of the electrode 6. Then, the cylindrical portion of the electrode 6 is caulked from outside to fix the lead wire 20 to the electrode 20.

Figure 16:
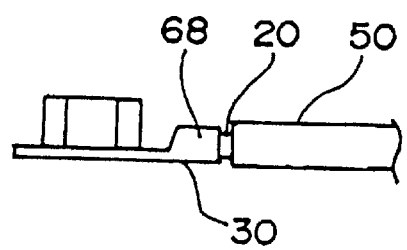
FIG. 16 is a partial explanatory view showing yet another embodiment of connecting a lead wire with an electrode.
Figure 17:
FIG. 17 is an explanatory view showing an embodiment of a pressing member.

FIG. 16 perpendicularly shows an example of connecting a lead wire 20 to the electrode 6. The connecting member 30 having a configuration of the nut is connected to one end of the lead wire 20. The connecting member 30 is fixed to the end of the electrode 6 by means of a bolt 52.

Evaluation

Figure 10:
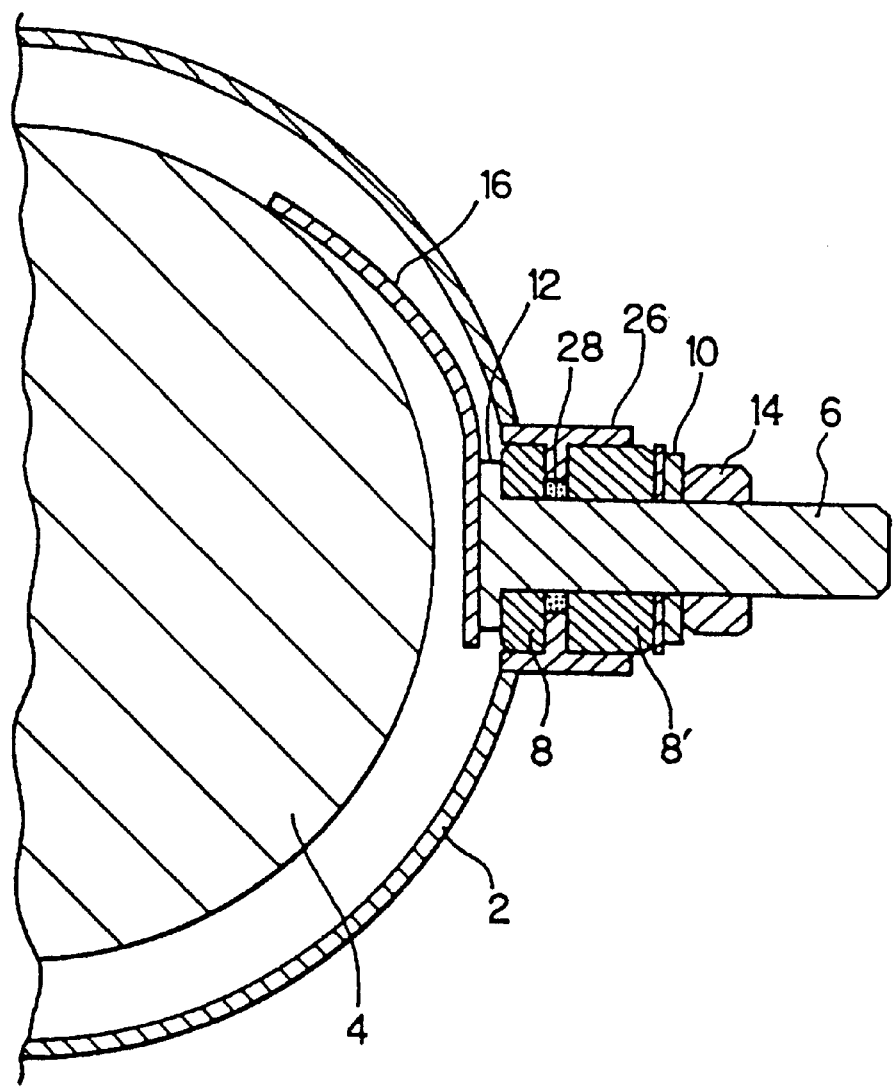
FIG. 10 is a cross-sectional view showing an embodiment of a conventional electrode structure.

The electrode structure of the present invention shown in FIG. 1 and the conventional electrode structure in FIG. 10 were measured for hygroscopicity and waterproof ability.

For measuring hygroscopicity of the electrode structures, the electrode structures were left in a condition having a humidity of 100%. For each electrode, there is measured a change of an insulating resistance between the electrode and the case for installing an electrode according to the time.

As a result, it was found that the electrode structure of the present invention maintained a high insulating resistance of 1MΩ even after 200 minutes passed, while the insulating resistance of the conventional electrode structure decreased to lower than 1MΩ after 30 minutes passed.

For measuring waterproof ability, an exhaust gas pipe is heated so that the temperature of the waterproof member rises up to 200° C. Water having a flow rate of 20 cc/min. is poured to the electrode for 5 seconds. This cycle was repeated 7 times. Then, the condition of water permeation into the case for installing an electrode was observed. As a result, there was no water permeation caused.

As described above, the present invention provides an electrode structure including one end of a lead wire and having an excellent convenience of composability, or the like, and an electric heater provided with the electrode structure. An electrode structure of the present invention is excellent in waterproof ability and gas sealability. Since a whole electrode of an electrode structure of the present invention has a bending configuration, the electrode has a practical size and a sufficient length to avoid a temperature rise in the end portion of the electrode. Therefore, the electrode structure can avoid deterioration of a waterproof member, etc., by a temperature rise in the end portion of the electrode structure. When the electrode itself has a bending structure, the electrode is composed of a plurality of members each successively oriented in the direction toward the axis of the electrode, each member being connected mutually with adjacent member(s). When a lead wire is connected with the electrode at the top end so as to form a predetermined angle, a case for installing an electrode is composed of the lower case member and the upper case member, thereby the electrode structure is excellent in workability upon composing.

What is claimed is:

1. An electrode structure comprising:
   an angled cylindrical metallic electrode having a plurality of members disposed successively in an axial direction of the electrode mutually connected to each other;
   a case for housing the metallic electrode and one end of a lead wire for electrification therein; and
   an insulating member positioned between the case and the electrode for insulating the case from the electrode.

2. An electrode structure according to claim 1, wherein the electrode comprises a first electrode member and a second electrode member, each having a cylindrical configuration and the second cylindrical member connecting with the lead wire at one end and the first electrode member at the other end so as to form a predetermined angle.

3. An electrode structure according to claim 2, wherein the first electrode member is threadedly engaged with the second electrode member by means of a negative screw portion arranged in the first electrode member and a positive screw portion arranged in the second electrode member.

4. An electrode structure according to claim 2, wherein the first electrode member is connected with the second electrode member by welding.

5. An electrode structure comprising:
   a metallic electrode having a columnar configuration and having a lead wire connected at the top end of the electrode and forming a predetermined angle with the electrode;
   a case for housing the metallic electrode and one end of the lead wire for electrification therein;
   an insulating member positioned between the case and the electrode for insulating the case from the electrode; and
   a waterproof member positioned between the case and the lead wire for avoiding permeation of water therebetween;
   wherein the electrode is spaced from the waterproof member to protect the waterproof member from deterioration due to a temperature increase at the top end of the electrode.

6. An electrode structure according to claim 5, wherein the case comprises:
   a lower member for installing a lower portion of the electrode, having a cylindrical portion covering a part or all of a peripheral surface of the electrode; and
   an upper member for installing an upper portion of the electrode, closing an opening portion of the cylindrical portion near an upper portion of the electrode.

7. An electrode structure according to claim 1, wherein a waterproof member is positioned between the case and the lead wire so as to avoid permeation of water from a gap between the case and the lead wire.

8. An electrode structure according to claim 1, wherein the electrode structure connects with a subject to be electrified, the subject being installed in a metallic housing, and electrifies the subject.

9. An electrode structure according to claim 1, wherein the subject to be electrified has a metallic honeycomb structure.

10. An electrode structure according to claim 7, wherein the waterproof member comprises a thermal resistant, insulating organic composite or a glass.

11. An electrode structure according to claim 10, wherein the insulating organic composite contains fluorine.

12. An electrode structure according to claim 7, wherein a case for installing the electrode is crimped from outside in the portion where a waterproof member is positioned.

13. An electrode structure according to claim 7, wherein a gap between at least (i) the case and the waterproof member and (ii) the waterproof member and the lead wire is sealed with an adhesive.

14. An electrode structure according to claim 1, wherein the insulating member comprises a first insulator, a second insulator, and an inorganic powder packed into a gap between the first insulator and the second insulator.

15. An electrode structure according to claim 1, wherein the insulating member comprises the first insulator, the second insulator, and a cement sealing material packed into the gap between the first insulator and the second insulator.

16. An electrode structure according to claim 14, wherein each of the first insulator and the second insulator comprises a ceramic material.

17. An electrode structure according to claim 2, wherein an insulating member is positioned between the second electrode member and the case or between the electrode and the lower case member.

18. An electrode structure according to claim 1, wherein a gap between the electrode and the insulating member and a gap between the insulating member and the case are sealed with a metallic sealing material.

19. An electrode structure according to claim 18, wherein an insulating member is positioned between the electrode and the case, and a spring member and a pressing member are positioned between the electrode and the case, the spring member absorbing differences in thermal expansion among the electrode, the case, and the insulating member, and the pressing member transmitting a load to the spring member.

20. An electrode structure according to claim 19, wherein an insulating member is positioned between the second electrode member and the case, and a spring member and a pressing member are positioned between the second electrode member and the case, the spring member absorbing differences in the thermal expansion among the second electrode member, the case, and the insulating member, and the pressing member transmitting a load to the spring member.

21. An electrode structure according to claim 19, wherein the pressing member is a nut mounted on the electrode.

22. An electrode structure according to claim 19, wherein the pressing member is fixed to the electrode by welding.

23. An electrode structure according to claim 19, wherein the pressing member is fixed to the electrode by crimping.

24. An electrode structure according to claim 1, wherein the insulating member is an insulating coat covering at least one of the electrode and the case.

25. An electrode structure according to claim 24, wherein a gap between the electrode and the case is sealed with an inorganic powder.

26. An electrode structure according to claim 1, wherein the insulating member is an insulating coat covering the electrode, and a gap between the case and the insulating coat is sealed with a metallic sealing material.

27. An electrode structure according to claim 1, wherein the insulating member is an insulating coat covering the case, and a gap between the electrode and the insulating coat is sealed with a metallic sealing material.

28. An electrode structure according to claim 24, wherein a material of the insulating coat is plasma-sprayed alumina.

29. An electrode structure according to claim 24, wherein a material of the insulating coat is a ceramic.

30. An electrode structure according to claim 14, wherein the inorganic powder is packed under a pressure.

31. An electrode structure according to claim 1, wherein a coat on the lead wire works as a waterproof member.

32. An electric heater comprising:
   a housing;
   a honeycomb structure installed in the housing; and
   an electrode structure for electrifying the honeycomb structure comprising:
      an angled cylindrical metallic electrode having a plurality of members disposed successively in an axial direction of the electrode mutually connected to each other;
      a case for housing the metallic electrode and one end of a lead wire for electrification therein; and
      an insulating member positioned between the case and the electrode for insulating the case from the electrode.

33. An electric heater comprising:

a housing;

a honeycomb structure installed in the housing; and an electrode structure for electrifying the honeycomb structure comprising:

a metallic electrode having a columnar configuration and having a lead wire connected at the top end of the electrode and forming a predetermined angle with the electrode;

a case for housing the metallic electrode and one end of the lead wire for electrification therein;

an insulating member positioned between the case and the electrode for insulating the case from the electrode; and a waterproof member positioned between the case and the lead wire for avoiding permeation of water therebetween;

wherein the electrode is spaced from the waterproof member to protect the waterproof member from deterioration due to a temperature increase at the top end of the electrode.

* * * * *